United States Patent [19]

Francotte et al.

[11] Patent Number: 5,091,520
[45] Date of Patent: Feb. 25, 1992

[54] FINELY PARTICULATE CELLULOSE ESTERS OF AROMATIC OR AROMATIC-ALIPHATIC CARBOXYLIC ACIDS, PROCESS FOR THEIR PREPARATION, AND THE USE THEREOF

[75] Inventors: Eric Francotte, Kaiseraugst, Switzerland; Gabriele Baisch, Weil-Friedlingen, Fed. Rep. of Germany

[73] Assignee: Ciba-Geigy Corporation, Ardsley, N.Y.

[21] Appl. No.: 578,060

[22] Filed: Sep. 5, 1990

Related U.S. Application Data

[62] Division of Ser. No. 257,363, Oct. 13, 1988.

[30] Foreign Application Priority Data

Oct. 26, 1987 [CH] Switzerland .......................... 4202/87
Jun. 24, 1988 [CH] Switzerland .......................... 2431/88

[51] Int. Cl.⁵ .................. C08B 3/04; B01D 39/18; B01D 71/10; B01J 20/24
[52] U.S. Cl. ......................................... 536/56; 536/58; 536/61; 536/63; 210/500.29; 210/500.3; 210/500.31; 210/500.32; 210/656; 502/404
[58] Field of Search ........... 210/500.29, 500.3, 500.31, 210/500.32, 656; 435/80; 502/404; 536/50, 56, 58, 61, 63

[56] References Cited

U.S. PATENT DOCUMENTS 4,318,820 3/1982 Malloy et al. ....................... 210/659

Primary Examiner—Thurman K. Page
Assistant Examiner—Carlos Azpuru
Attorney, Agent, or Firm—Kevin T. Mansfield

[57] ABSTRACT

Finely particulate cellulose esters of aromatic or aromatic-aliphatic carboxylic acids in the form of substantially spherical, partially crystalline particles having an average diameter of 1 to 200 μm and a specific surface area of 10 to 300 m²/g, are suitable for use as stationary phase in methods of chromatographic separation, especially for the resolution of racemates.

1 Claim, No Drawings

FINELY PARTICULATE CELLULOSE ESTERS OF AROMATIC OR AROMATIC-ALIPHATIC CARBOXYLIC ACIDS, PROCESS FOR THEIR PREPARATION, AND THE USE THEREOF

This is a divisional of application Ser. No. 257,363 filed on Oct. 13, 1988.

The present invention relates to partially crystalline, substantially spherical particles of cellulose esters of aromatic or aromatic-aliphatic carboxylic acids, to a process for their preparation, and to the use thereof as stationary phase in methods of chromatographic separation.

Microcrystalline cellulose triacetate, which is obtainable by heterogeneous esterification, has been widely used with success for the separation of racemates into their stereoisomers by chromatography. Cellulose, other polysaccharides and derivatives thereof are also suitable for use as liquid phase for such separations, q.v. T. Shibata et al., J. of Liquid Chrom., 9, 313–40 (1986).

A chromatographic separating material consisting of a macroporous silica gel coated with cellulose triacetate or cellulose tribenzoate is described by Y. Okamoto et al. in Chemistry Letters, pp. 739-742 (1984). This packing material is expensive. Moreover, only the layer of the cellulose derivative is available for the resolution of the enantiomers, so that the separating ability in respect of capacity is not entirely satisfactory. In J. of Chromatograph, 351, pp. 346-350 (1986), K.-H. Rimböck proposes the use of powdered microcrystalline tribenzoyl cellulose, which is obtained by simple precipitation from a solution, as stationary phase. The separating ability of the powdered material is insufficient, and the utility is limited to the solving of analytical problems. In addition, the particle size and external particle form cannot be controlled in this method.

A process for the preparation of spherical, porous cellulose particles is disclosed in European patent application A-0 025 639. In this process, an organic solution of cellulose triacetate which contains a higher alcohol is suspended, with stirring, in an aqueous phase that contains a high molecular dispersant, e.g. polyvinyl alcohol or gelatin. After removal of the organic solvent, the cellulose triacetate particles are isolated and purified and then saponified. Our own investigations have revealed that the cellulose triacetate particles obtained by this process have only a low specific surface area and, as stationary phase in methods of liquid chromatographic analysis, have only limited ability for resolving racemates.

One object of this invention is to provide finely particulate cellulose esters of aromatic or aromatic-aliphatic carboxylic acids in the form of substantially spherical, partially crystalling particles having an average diameter of 1 to 200 μm and a specific surface area of 10 to 300 m²/g.

The average particle diameter is preferably 3 to 100 μm, most preferably 5 to 80 μm. For analytical separations, an average particle diameter of about 5 to 50 μm, and for preparative separations of about 10 to 100 μm, has proved useful. The average particle diameter can also comprise only a fairly narrow range. Such materials can be prepared by fractionation by conventional methods, for example sedimentation, sieving or sifting.

The specific surface area is preferably 20 to 80 m²/g, most preferably 30 to 70 m²/g.

Surprisingly, the finely particulate cellulose esters of this invention exhibit the partially crystalline character suitable for the chromatographic separation ability. The relative crystallinity can be indicated by the heat of fusion of the partially crystalline components of the cellulose esters, which is suitably determined by calorimetry, for example differential scanning calorimetry (DSC). The heat of fusion is preferably 50 J/g, more preferably 2 to 50 J/g, especially 5 to 30 J/g and, most preferably, 10 to 25 J/g.

The carboxylic acids from which the cellulose esters are derived preferably have the formula R—X—COOH, wherein X is a direct bond, $C_1$–$C_4$alkylene, $C_2$–$C_4$alkenylene, $C_2$–$C_4$alkylidene or $C_2$–$C_4$alkynylene, and R is monocyclic, bicyclic or tricyclic, preferably monocyclic, $C_6$–$C_{14}$aryl or heteroaryl, each containing 5 or 6 ring atoms and one to three, preferably one or two, hetero atoms selected from the group consisting of N, O and S, and R is unsubstituted or substituted by one or more members of the group consisting of $C_1$–$C_{12}$alkyl, preferably $C_1$–$C_4$alkyl, $C_1$–$C_{12}$alkoxy, preferably $C_1$–$C_{12}$alkoxy, $C_1$–$C_{12}$alkylthio, preferably $C_1$–$C_4$alkylthio, phenyl, phenoxy, phenylthio, benzyl, benzoxy, benzylthio, cyano, halogen, $C_1$–$C_8$acyl, $C_1$–$C_8$acyloxy, hydroxy, $C_1$–$C_{12}$alkoxycarbonyl, phenoxycarbonyl, benzoxycarbonyl, nitro and di($C_1$–$C_6$alkyl)amino. Preferred substituents are chlorine, methyl, ethyl and methoxy.

X as alkylene contains preferably 1 to 3 and, most preferably, 1 or 2, carbon atoms. X as alkenylene, alkylidene or alkynylene contains preferably 2 or 3 carbon atoms. Alkylene, alkenylene and alkynylene can be linear or branched. Representative examples of such groups are methylene, ethylene, ethylidene, ethenylene, ethynylene, 1,2- or 1,3-propylene, 1,1- or 2,2-propylidene, 1,2- or 1,3-prop-1-enylene or 1,2- or 1,3-prop-2-enylene, 1,3-propynylene, 1,2-, 1,3-, 1,4- or 2,3-butylene, 1,1- or 2,2-butylidene, 1,2-, 1,3- or 1,4-but-1-enylene, 1,2-, 1,3- or 1,4-but-2-enylene or 1,2-, 1,3- or 1,4-but-3-enylene, 1,2-, 1,3- or 1,4-but-1-ynylene, 1,2-, 1,3- or 1,4-but-2-ynylene or 1,2-, 1,3- or 1,4-but-3-ynylene. More preferably X is $C_1$–$C_3$alkylene, $C_2$–$C_3$alkylidene or $C_2$–$C_3$alkenylene or a direct bond. In particular, X is a direct bond, methylene, ethylene or ethenylene. In a preferred embodiment of the invention, X is a direct bond or 1,2-ethenylene.

R as aryl preferably contains 6 to 10 carbon atoms. The aryl can be condensed with alkylene or alkenylene of 2 to 4 carbon atoms. Aryl is typically phenyl, naphthyl, phenanthryl, anthracyl, indenyl, indanyl, fluorenyl, fluorenonyl, anthraquinonyl, xanthonyl, thioxanthonyl. Preferably R is naphthyl and, most preferably, phenyl.

R as heteroaryl preferably contains 1 hetero atom selected from the group consisting of O, S and N. The heteroaryl can be condensed with phenylene. Heteroaryl is typically furyl, thionyl, pyrryl, benzofuryl, benzthionyl, indyl, pyridyl, primidyl, quinolinyl and isoquinolinyl. Pyridyl is especially preferred.

The radical R can carry one or more, preferably one to three and, most preferably, one or two, substituents selected from the group consisting of $C_1$–$C_{12}$alkyl, preferably $C_1$–$C_4$alkyl, $C_1$–$C_{12}$alkoxy, preferably $C_1$–$C_4$alkoxy, or $C_1$–$C_{12}$alkylthio, preferably $C_1$–$C_4$alkylthio, for example methyl, ethyl, n- or isopropyl, n-butyl, isobutyl or tert-butyl, pentyl, hexyl, heptyl, octyl, nonyl, decyl, undecyl, dodecyl and corresponding alkoxy or alkylthio radicals, with methyl, ethyl, methoxy and ethoxy being preferred; phenyl, phenoxy, phenylthio, benzyl, benzoxy and benzylthio, preferably phenyl or benzyl; hydroxy, cyano, halogen, preferably F, Cl and Br; $C_1-C_8$acyl or $C_1-C_8$acyloxy, preferably $C_1-C_4$acyl or $C_1-C_4$acyloxy, for example acetyl, chloroacetyl, dichloroacetyl, trichloroacetyl, fluoroacetyl, trifluoroacetyl, propionyl, butanoyl, benzoyl and phenylacetyl, and corresponding acyloxy radicals; $C_1-C_{12}$alkoxycarbonyl, preferably $C_1-C_4$alkoxycarbonyl, phenoxycarbonyl and benzoxycarbonyl.

In a preferred embodiment of the invention, the substituents are $C_1-C_4$alkyl or halogen, preferably methyl, ethyl, F or Cl.

In a preferred embodiment of the invention, X is a direct bond, $C_1-C_3$alkylene or $C_2-C_3$alkenylene, and R is unsubstituted or substituted phenyl or pyridyl. Most preferably, X is a direct bond, methylene, ethylene and ethenylene.

The invention further relates to a process for the preparation of the cellulose esters used herein, which comprises slowly adding, with efficient stirring, a solution of a cellulose ester of an aromatic or aromatic-aliphatic carboxylic acid in an organic solvent that contains 1 to 50% by volume, based on the amount of the solvent, of a $C_5-C_{22}$alkanol, to a solution of an anionic surfactant in water, removing the organic solvent with continued stirring, isolating the solid particles and washing and drying them.

The cellulose esters can be prepared by known methods of esterification. The degree of polymerisation can be from 5 to 1000, preferably from 5 to 500 and, most preferably, from 10 to 50.

The degree of esterification of the cellulose ester can be 1 to 3, preferably 2 to 3 and, most preferably, 2.5 to 3. The attainable degree of esterification can depend on the reactivity of the carboxylic acid employed.

The particle size can be influenced by the stirring rate, which can be, for example, 100 to 1000 rpm, and by the amount of cellulose ester in the organic solvent and the rate of addition of the organic solution to the aqueous phase.

The specific surface area can be influenced by the reaction conditions, for example the choice of solvent, alkanol and surfactant, by the reaction parameters, for example the rate of addition and stirring, the evaporation rate, and by the ratio of solvent, water, alkanol, surfactant and cellulose ester.

The amount of cellulose ester in the organic solvent can be, for example, 1 to 20% by weight, preferably 1 to 12% by weight, based on the solvent.

It can be advantageous to use a substantially water-insoluble solvent.

The organic solvent preferably has a lower boiling point than that of water. Examples of suitable solvents are aromatic hydrocarbons, halogenated hydrocarbons, preferably fluorinated and/or chlorinated hydrocarbons, cyclic ethers, carboxylic acid esters and ketones. Typical examples of such solvents are benzene, toluene, xylene, methylene chloride, chloroform, trichlorofluoromethane, chloroethane, trifluorotrichloroethane, dichlorotetrafluoroethane, acetone, methyl ethyl ketone, diethyl ketone, cyclohexanone, tetrahydrofuran and dioxane or mixtures of such solvents. The most preferred solvents are methylene chloride and tetrahydrofuran.

It is also possible to use solvents that have a higher boiling point than water, for example, toluene, xylene, chlorobenzene, ethylene glycol or diethylene glycol ether. The solvent is then removed together with water.

In doing so it is expedient to replace the water that has been removed, for example during the distillation, or to use a suitably larger amount of water in the reaction.

The organic solution preferably contains an alkanol in an amount of 5 to 40% by volume. The alkanol can be branched and, preferably, linear. It contains preferably 7 to 16 and, most preferably, 7 to 12, carbon atoms. Examples of such alkanols are pentanol, hexanol, heptanol, octanol, nonanol, decanol, undecanol, dodecanol, tridecanol, tetradecanol, hexadecanol, octadecanol and eicosanol. The alkanols are preferably substantially water-insoluble. Especially preferred alkanols are linear $C_7-C_{10}$alkanols.

The volume ratio of the organic solution to the aqueous phase is preferably 10:1 to 1:10, more particularly 5:1 to 1:5 and, most preferably, 3:1 to 1:3.

The anionic surfactant is preferably present in the aqueous solution in an amount of 0.05 to 10% by weight, preferably 0.1 to 5% by weight, based on the amount of water.

The anionic surfactant can be, for example, an acid, a hemiester of dibasic to tetrabasic acids, in particular dibasic or tribasic acids or salts thereof. Examples of suitable salts are ammonium salts, alkali metal salts (preferably sodium and potassium salts), or alkaline earth metal salts (preferably magnesium and calcium salts).

The acids and hemiesters contain, for example, linear or branched $C_1-C_{20}$alkyl groups or phenyl groups which are substituted by 1 to 3 $C_1-C_{20}$alkyl groups. The acids can also contain $C_1-C_{20}$perfluoroalkyl groups. Examples of suitable acids are mono- or dicarboxylic acids, sulfonic acids, phosphonic acids and phosphinic acids. Suitable polybasic acids for hemiesters are, for example, sulfuric acid, phosphoric acid, phosphorous acid, malonic acid and maleic acid. A great number of such surfactants are described in the National Standard Reference Data System (NSRDS), Nat. Bur. Stand. (U.S.) 36, pp. 24-32, U.S. Government Printing Office (1971). Preferred surfactants are $C_8-C_{16}$sulfuric acid hemiesters, especially lauryl sulfate.

The process can be carried out such that the solution of the cellulose ester is added dropwise, with stirring, to the aqueous phase and subsequently, with continued stirring, the solvent is removed, conveniently by distillation with heating up to the boiling point of the solvent and/or under vacuum. The particles are then isolated, for example by decantation or filtration. The particles are then purified, for example by washing with water and a hydrophilic solvent, preferably with a $C_1-C_4$alkanol. The material is then dried.

Surprisingly, the process affords cellulose esters of aromatic or aromatic-aliphatic carboxylic acids in the form of substantially spherical particles which have a high porosity (specific surface area) and a partially crystalline character, which is important for the resolution of enantiomers by chromatography. The use of macroporous packing material (e.g. silica gel Si 1000/4000) can be avoided. The separating efficiency is surprisingly good and better than that of comparable products. It is advantageous that higher loadings can be used. It is particularly surprising that the cellulose esters of this invention have an exceedingly high compressive strength, which so far has only been possible with cellulose esters coated on silica gel [q.v. Chemistry Letters, pp. 739-742 (1984)]. This excellent compressive strength makes the materials suitable for high-performance liquid chromatography.

The invention further relates to the use of the cellulose esters of the invention as stationary phase in chromatography, especially for resolving racemates.

The following Examples illustrate the invention in more detail. Percentages are by weight, unless otherwise stated.

(A)

PREPARATORY EXAMPLES

Example 1

5 g of cellulose tribenzoate in 150 ml of methylene chloride are treated with 17 ml of heptane. The resultant solution is added dropwise, at room temperature, to a 0.75% solution of sodium lauryl sulfate (300 ml) which is stirred at 400 rpm. At the same rate of stirring, the methylene chloride is removed by evaporation at 40°–42° C. (bath temperature). The residue is isolated by filtration and washed with water and ethanol. The powdered product is dried in a vacuum drier at 80° C. (20 hours). Yield: 4.8 g (96% of theory). The spherical particles having a diameter of 10–30 μm can be fractionated, as desired, by sieving or sedimentation. The physical properties of the products are determined as follows:

Specific surface area: 59.6 m$^2$/g.

The specific surface area (m$^2$/g) is determined by the BET method.

Crystallinity: 19.3 J/g.

The relative crystallinity is determined by DSC (differential scanning calorimetry; Mettler TA3000) from the heat of fusion ΔH (J/g).

EXAMPLE 2

The process of Example 1 is repeated with different compositions and yields the products listed in Table 1.

TABLE 1

| Benzoyl cellulose (g) | CH$_2$Cl$_2$ (ml) | n-Heptanol (ml) | SLS[1] (%, ml) | Specific surface area (m$^2$/g) | DSC ΔH (J/g) | Diameter (μm) |
| --- | --- | --- | --- | --- | --- | --- |
| 36.6 | 1000 | 124 | 0.75, 2200 | 43.7 | 17.2 | 10–20 |
| 5 | 150 | 25 | 0.75, 300 | 64.2 | 18.9 | 10–30 |
| 5 | 75 | 25 | 0.75, 120 | 50.3 | 19.6 | 20–30 |
| 5 | 150 | 37.5 | 0.75, 300 | 40.9 | 17.6 | 10–20 |
| 50 | 750 | 150 | 0.75, 1200 | 46.5 | 15.4 | 20–30 |
| 4 | 120 | 20 | 1.50, 88 | 55.0 | 15.3 | 3–8 |
| 4 | 120 | 20 | 0.10, 88 | 63.1 | 15.6 | 5–15 |

[1]SLS: solution of sodium lauryl sulfate in water

EXAMPLE 3

In accordance with the procedure described in Example 1, 6 g of cellulose tribenzoate in 180 ml of CHCl$_3$ are treated with 30 ml of heptanol and 145 ml of a 0.75% solution of sodium lauryl sulfate. The chloroform is removed by evaporation at 65° C. The powdery material is isolated by filtration and washed with water and then with ethanol, and subsequently dried. Yield: 95% of theory (specific surface area: 59.9 m$^2$/g; ΔH: 14.45 J/g; diameter: 5–10 μm).

EXAMPLE 4

In accordance with the procedure described in Example 1, 5 g of cellulose tribenzoate in 150 ml of methylene chloride are treated with 17 ml of decanol and 300 ml of a 0.75% solution of sodium lauryl sulfate and the product is isolated. Specific surface area: 31.6 m$^2$/g; ΔH: 16.0 J/g; diameter: 10–20 μm.

EXAMPLE 5

In accordance with the procedure described in Example 1, 2 g of cellulose tribenzoate in 60 ml of methylene chloride are treated with 10 ml of heptanol and 48 ml of a solution of sodium dodecylbenzylsulfonic acid (1% in water) and the product is isolated. Specific surface area: 53.2 m$^2$/g; ΔH: 15.8 J/g; diameter: 5–10 μm.

EXAMPLE 6

In accordance with the procedure described in Example 1, 10 g of cellulose tri(paramethylbenzoate) in 300 ml of methylene chloride are treated with 50 ml of heptanol and 240 ml of a 0.7% solution of sodium lauryl sulfate and the product is isolated. Specific surface area: 8.7 m$^2$/g; ΔH: 10.6 J/g; diameter: 5–10 μm.

EXAMPLE 7

In accordance with the procedure described in Example 1, 10 g of cellulose tri(metamethylbenzoate) in 300 ml of methylene chloride are treated with 50 ml of heptane and 240 ml of a 0.7% solution of sodium lauryl sulfate and the product is isolated. Specific surface area: 57.8 m$^2$/g; ΔH: 12.7 J/g; diameter: 10–20 μm.

EXAMPLE 8

In accordance with the procedure described in Example 1, 5 g of cellulose tricinnamate in 150 ml of methylene chloride are treated with 45 ml of heptanol and 120 ml of a 0.1% solution of sodium lauryl sulfate and the product is isolated. Specific surface area: 28.7 m$^2$/g; ΔH: 8.2 J/g; diameter: 5–20 μm.

EXAMPLE 9

5 g of o-methylbenzoyl cellulose in 300 ml of tetrahydrofuran are treated with 12 ml of heptanol. The polymer solution is added dropwise at room temperature to a 0.7% solution of sodium lauryl sulfate in water (300 ml) which is stirred at 400 rpm. At the same rate of stirring, the tetrahydrofuran is distilled off at 70°–75° C. (bath temperature). The residue is isolated by filtration and washed with water and ethanol. The product is dried in a vacuum drier at 80° C. Yield: 4.9 g (98% of theory). Specific surface area: 36.1 m$^2$/g; ΔH: 2.6 J/g; diameter: 5–20 μm.

EXAMPLE 10

In accordance with the procedure described in Example 1, 3 g of p-ethylbenzoyl cellulose in 180 ml of methylene chloride are treated with 30 ml of heptanol and 180 ml of a 0.7% solution of sodium lauryl sulfate and the product is isolated. Specific surface area: 28.6 m$^2$/g; ΔH: 2.8 J/g; diameter: 3–5 μm.

EXAMPLE 11

In accordance with the procedure described in Example 9, 5 g of p-chlorobenzoyl cellulose in 150 ml of tetrahydrofuran are treated wtih 37.5 ml of heptanol and 300 ml of a 0.7% solution of sodium lauryl sulfate and the product is isolated. Specific surface area: 68.3 m²/g; ΔH: J/g; diameter: 20–40 μm.

EXAMPLE 12

In accordance with the procedure described in Example 9, 5 g of m-chlorobenzoyl cellulose in 150 ml of tetrahydrofuran are treated with 35 ml of heptanol and 300 ml of a 0.7% solution of sodium lauryl sulfate and the product is isolated. Specific surface area: 38.9 m²/g; ΔH: 10.8 J/g; diameter: 5–15 μm.

(B)

USE EXAMPLES

A steel column (25 cm×0.46 cm) is packed with a number of the prepared products by the slurry method and various test racemates are resolved:

Definition of the capacity factor k' and the separation factor α:

$$\text{capacity factor } (k') = \frac{\left(\begin{array}{c}\text{retention volume of}\\\text{the enantiomer}\end{array}\right) - \left(\begin{array}{c}\text{retention volume of a}\\\text{non-retained compound}\end{array}\right)}{\left(\begin{array}{c}\text{retention volume of a}\\\text{non-retained compound}\end{array}\right)}$$

$$\text{separation factor } (\alpha) = \frac{\text{capacity factor of the 2nd eluted enantiomer}}{\text{capacity factor of the 1st eluted enantiomer}}$$

The HPLC resolutions are carried out with a 110 B (Beckman) pmp. Detection is made by UV spectroscopy (Shimidzu UV-120-02, fitted with HPLC cell No. 1200) and polarimetry (Perkin Elmer 241 LC). The conditions of the chromatography are: hexane/2-propanol (9:1) as eluant; rate of flow 1 ml/min; temperature 25° C. The results are reported in Tables 2 to 5.

TABLE 2

Resolution of enantiomers by chromatographing racemic compounds on the product of Example 1

| Racemate | Capacity factor $k'_1$ | Capacity factor $k'_2$ | Separation factor α |
|---|---|---|---|
| phenyl ethanol | 1.29 | 2.42 | 1.88 |
| phenyl ethanediol | 2.0 | 2.86 | 1.43 |
| phenyl vinylsulfone | 7.91 | 12.71 | 1.60 |
| butan-1,3-diol-diacetate | 3.64 | 7.19 | 1.98 |
| tetrahydro-1-naphthol | 0.94 | 2.06 | 2.19 |

TABLE 3

Resolution of enantiomers by chromatographing racemic compounds on the product of Example 7

| Racemate | Capacity factor $k'_1$ | Capacity factor $k'_2$ | Separation factor α |
|---|---|---|---|
| trans-stilbene oxide | 3.67 | 11.60 | 3.10 |
| 1-naphthyl ethanol | 8.67 | 11.5 | 1.33 |

TABLE 4

Resolution of enantiomers by chromatography of racemic compounds on the product of Example 8

| Racemate | Capacity factor $k'_1$ | Capacity factor $k'_2$ | Separation factor α |
|---|---|---|---|
| 1-naphthyl ethanol | 10.3 | 11.96 | 1.16 |
| methyl mandelate | 13.07 | 15.11 | 1.16 |

TABLE 5

Resolution of enantiomers by chromatography of racemic compounds on the product of Example 6

| Racemate | Capacity factor $k'_1$ | Capacity factor $k'_2$ | Separation factor α |
|---|---|---|---|
| 1-naphthyl ethanol | 8.64 | 11.78 | 1.36 |
| benzoin | 11.52 | 15.18 | 1.32 |
| Troeger base | 2.62 | 23.76 | 9.07 |

What is claimed is:

1. In the method for resolving a racemic mixture by passing a solution of the racemic mixture through a column with a stationary phase and collecting the separated components of the mixture, the improvement comprising having a stationary phase which is a cellulose ester of an aromatic or aromatic aliphatic carboxylic acid in the form of substantially spherical particles having a heat of fusion as determined by calorimetry of 1 to 50 J/g, an average diameter of 1 to 200 μm and a specific surface area of 10 to 300 m²/g.

* * * * *